United States Patent
Onishi (10) Patent No.: US 12,012,310 B2
(45) Date of Patent: Jun. 18, 2024

(54) CRANE INFORMATION DISPLAY SYSTEM

(71) Applicant: TADANO LTD., Kagawa (JP)

(72) Inventor: Sho Onishi, Kagawa (JP)

(73) Assignee: TADANO LTD., Kagawa (JP)

( * ) Notice: Subject to any disclaimer, the term of this patent is extended or adjusted under 35 U.S.C. 154(b) by 313 days.

(21) Appl. No.: 17/642,077

(22) PCT Filed: Sep. 25, 2020

(86) PCT No.: PCT/JP2020/036283
§ 371 (c)(1),
(2) Date: Mar. 10, 2022

(87) PCT Pub. No.: WO2021/060471
PCT Pub. Date: Apr. 1, 2021

(65) Prior Publication Data
US 2022/0380184 A1 Dec. 1, 2022

(30) Foreign Application Priority Data

Sep. 27, 2019 (JP) .................... 2019-176779

(51) Int. Cl.
*B66C 13/46* (2006.01)
*G06T 7/70* (2017.01)
*H04N 5/272* (2006.01)

(52) U.S. Cl.
CPC .............. *B66C 13/46* (2013.01); *G06T 7/70* (2017.01); *H04N 5/272* (2013.01)

(58) Field of Classification Search
None
See application file for complete search history.

(56) References Cited

U.S. PATENT DOCUMENTS

| 2016/0063709 A1* | 3/2016 | Booij | B66C 23/52 348/142 |
| 2020/0140239 A1* | 5/2020 | Schoonmaker | G01S 17/89 |

(Continued)

FOREIGN PATENT DOCUMENTS

| EP | 3594166 A1 * | 1/2020 | ............. B66C 13/40 |
| JP | 4727068 B2 * | 7/2011 | ............. G01C 15/00 |
| JP | 2014-227281 A | 12/2014 | |

OTHER PUBLICATIONS

Nov. 10, 2020, International Search Report issued for related PCT application No. PCT/JP2020/036283.

(Continued)

*Primary Examiner* — Ricky Chin
(74) *Attorney, Agent, or Firm* — Paratus Law Group, PLLC (57) ABSTRACT

This crane information display system is provided with a terminal device having a camera and captures an image of a crane with the camera to obtain a camera image, said crane information display system comprising: a crane detection unit that detects the orientation of the crane in the camera image; an information processing unit that identifies the position and posture of the crane in the coordinate system of the camera image; a working capacity calculation unit that calculates the working capacity of the crane on the basis of the information relating to the crane inputted to an input unit; and an image display unit that converts the working capacity of the crane into three-dimensional image information corresponding to the position and posture of the crane, overlays the image information on the camera image, and displays the same.

6 Claims, 9 Drawing Sheets

(56) References Cited

U.S. PATENT DOCUMENTS

| | | | |
|---|---|---|---|
| 2022/0340398 A1* | 10/2022 | Yoneda | B66C 13/40 |
| 2022/0356048 A1* | 11/2022 | Yoneda | B66C 13/46 |
| 2022/0380184 A1* | 12/2022 | Onishi | G06T 7/70 |

OTHER PUBLICATIONS

Nov. 10, 2020, International Search Opinion issued for related PCT application No. PCT/JP2020/036283.

* cited by examiner

| | MAXIMUM EXTENSION OF OUTRIGGER (6.6m) | | -ENTIRE CIRCUMFERENCE- | UNIT (t) |
|---|---|---|---|---|
| BOOM LENGTH / WORKING RADIUS | 9.35m | 16.4m | 23.45m | 30.5m |
| 2.5m | 25.0 | 18.0 | 12.5 | |
| 3.0m | 25.0 | 18.0 | 12.5 | |
| 3.5m | 25.0 | 18.0 | 12.5 | 8.0 |
| 4.0m | 23.5 | 18.0 | 12.5 | 8.0 |
| 4.5m | 21.5 | 18.0 | 12.5 | 8.0 |
| 5.0m | 19.6 | 18.0 | 12.5 | 8.0 |
| 5.5m | 17.8 | 17.0 | 12.5 | 8.0 |
| 6.0m | 16.3 | 16.0 | 12.5 | 8.0 |
| 6.5m | 15.1 | 15.0 | 12.25 | 8.0 |
| 7.0m | | 14.0 | 11.5 | 8.0 |
| 8.0m | | 11.4 | 10.2 | 8.0 |
| 9.0m | | 9.3 | 9.0 | 8.0 |
| 10.0m | | 7.8 | 7.6 | 7.15 |
| 11.0m | | 6.5 | 6.65 | 6.4 |

*FIG. 8*

CRANE INFORMATION DISPLAY SYSTEM

CROSS REFERENCE TO PRIOR APPLICATION

This application is a National Stage Patent Application of PCT International Patent Application No. PCT/JP2020/036283 (filed on Sep. 25, 2020) under 35 U.S.C. § 371, which claims priority to Japanese Patent Application No. 2019-176779 (filed on Sep. 27, 2019), which are all hereby incorporated by reference in their entirety.

TECHNICAL FIELD

The present invention relates to a crane information display system.

BACKGROUND ART

Conventionally, a crane information display system that displays information of a crane is known (e.g., refer to Patent Literature 1).

Patent Literature 1 discloses a configuration that visualizes information relating to an operating state of a crane and displays a display screen on a display unit of a mobile terminal. As a result, even a person outside the crane can grasp the operating state of the crane.

CITATION LIST

Patent Literature

Patent Literature 1: JP 2014-227281 A

SUMMARY OF THE INVENTION

Problems to be Solved by the Invention

In the configuration described in Patent Literature 1, however, the information relating to the operating state of the crane is visualized and displayed by drawing the crane from above or from the side. Therefore, the configuration described in Patent Literature 1 has a problem that a two-dimensional examination is required.

Therefore, an object of the present invention is to provide a crane information display system capable of three-dimensionally examining information relating to a crane at a work site.

Solutions to Problems

A main aspect of the present disclosure for solving the above-described problems is a crane information display system that is provided with a terminal device having a camera and captures an image of a crane with the camera to obtain a camera image. The crane information display system includes: a crane detection unit that detects the crane in the camera image based on image information of the camera image; an information processing unit that identifies a position and a posture of the crane in a coordinate system of the camera image based on an orientation of the camera with respect to the crane identified from the crane in the camera image, a position of the camera in a real space indicated by a first satellite positioning signal reception unit mounted on the camera, and a position of the crane in a real space indicated by a second satellite positioning signal reception unit mounted on the crane; a working capacity calculation unit that calculates a working capacity of the crane based on information relating to the crane inputted to an input unit; and an image display unit that converts the working capacity of the crane into three-dimensional image information corresponding to the position and the posture of the crane identified by the information processing unit, overlays the image information on the camera image, and displays the overlaid image.

Effects of the Invention

In the crane information display system of the present invention configured as described above, the information relating to the crane can be examined three-dimensionally at the work site.

DESCRIPTION OF EMBODIMENTS

Hereinafter, embodiments for implementing a crane information display system according to the present invention will be described with reference to Examples 1 to 3 illustrated in the drawings.

Example 1

[Configuration of Crane Information Display System]

Figure 1:
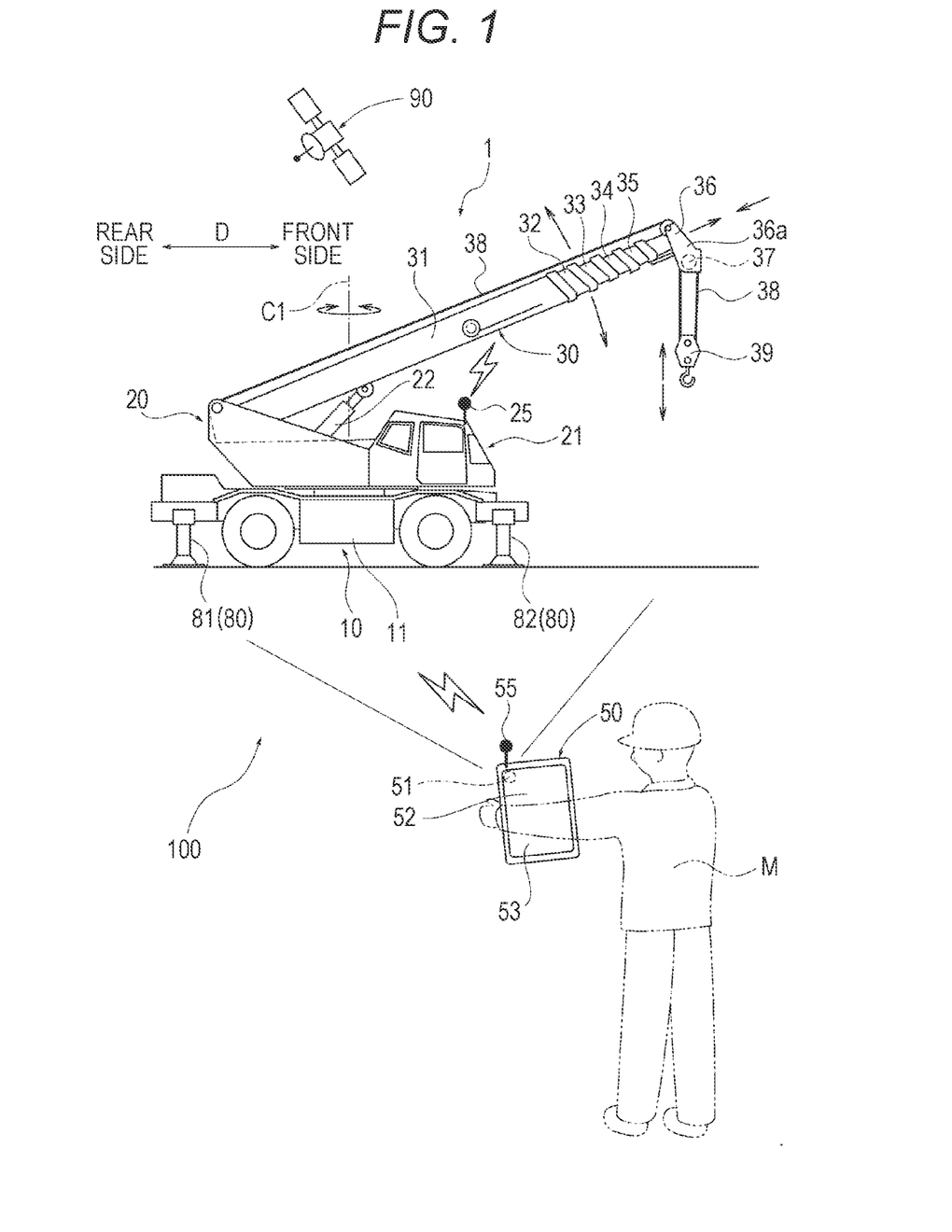
FIG. 1 is a view illustrating a crane information display system of Example 1.

FIG. 1 is a view illustrating a crane information display system of Example 1. Hereinafter, a configuration of the crane information display system of Example 1 will be described.

A crane information display system 100 of Example 1 will be described with an example in which a worker M captures an image of a crane 1 placed at a work site with a tablet terminal 50 as a user terminal provided with a camera 51, as illustrated in FIG. 1. The crane information display system 100 of Example 1 will be described with an example in which an image of the crane 1 in a state in which an outrigger 80 does not extend is captured by the camera 51. Note that the front-rear direction of the crane 1 is defined as a front-rear direction D.

[Configuration of Crane]

As illustrated in FIG. 1, the crane 1 includes a traveling body 10, a turning body 20, and a boom 30.

The traveling body 10 includes a vehicle body frame 11, the outrigger 80, a traveling device configured for self-traveling on a road or a work site, and the like.

The outrigger 80 includes a rear outrigger 81 attached to a rear side surface of the vehicle body frame 11 of the traveling body 10 and a front outrigger 82 attached to a front side surface of the vehicle body frame 11. The outrigger 80 is housed in the vehicle body frame 11 during traveling. On the other hand, the outrigger 80 extends in the horizontal direction and the vertical direction and lifts the entire vehicle body to stabilize a posture.

The turning body 20 is provided above the traveling body 10 and is rotatable about a vertical axis C1 relative to the traveling body 10. The turning body 20 includes a cabin 21. The cabin 21 includes operation units (e.g., a steering wheel, a shift lever, an accelerator pedal, a brake pedal, and the like) configured to control traveling of the traveling body 10. Further, the cabin 21 includes operation units that operate the turning body 20, the boom 30, a winch, and the like. A worker riding in the cabin 21 operates the operation units to turn the turning body 20, raise/lower and extend/contract the boom 30, and rotate the winch to perform the work.

A crane reception unit 25 is attached to the turning body 20. The crane reception unit 25 (corresponding to a "second satellite positioning signal reception unit" of the present invention) receives a global navigation satellite system (GNSS) signal from a GNSS satellite serving as a satellite 90, for example, to execute positioning, and acquires position information of a turning center of the crane 1 in the real space.

A base end side of the boom 30 is supported by the turning body 20, and is attached to the turning body 20 so as to be raised and lowered. The boom 30 is raised and lowered by a derricking cylinder 22 provided in the turning body 20, and is expanded and contracted by a telescopic cylinder (not illustrated).

The boom 30 includes intermediate booms 32 to 35 between a base end boom 31 on the base end side and a distal end boom 36 on a distal end side. The intermediate booms 32 to 35 and the distal end boom 36 are telescopically stored in the base end boom 31 in sequence.

A sheave 37 is arranged in a boom head 36a provided at a distal end of the distal end boom 36. A wire rope 38 for a suspended load is wound around the winch provided near the base end of the boom 30 of the turning body 20. The wire rope 38 is arranged along the axial direction of the boom 30 from the winch to the sheave 37, and the wire rope 38 wound around the sheave 37 is suspended downward in the vertical direction from the sheave 37. A hook 39 is provided at the lowermost portion of the wire rope 38.

A load is suspended on the hook 39, and the wire rope 38 wound around the winch is unwound to lower the hook 39, and the wire rope 38 is wound up to raise the hook 39.

The crane 1 configured in this manner moves the load suspended on the hook 39 to a predetermined position by unwinding and winding the wire rope 38 by the winch, raising/lowering and extending/contracting the boom 30, and turning the turning body 20.

[Configuration of Tablet Terminal]

As illustrated in FIG. 1, the tablet terminal 50 includes the camera 51, an image display unit 53, an input unit 52, and a camera reception unit 55.

An image captured by the camera 51 is displayed on the image display unit 53. The image display unit 53 is also configured as a touch panel serving as the input unit 52.

The camera reception unit 55 (corresponding to a "first satellite positioning signal reception unit" of the present invention) receives a global navigation satellite system (GNSS) signal from the GNSS satellite serving as the satellite 90, for example, to execute positioning, and acquires a position of the camera 51 in the real space, that is, position information of the tablet terminal 50.

[Functional Configuration of Crane Information Display System]

Figure 2:
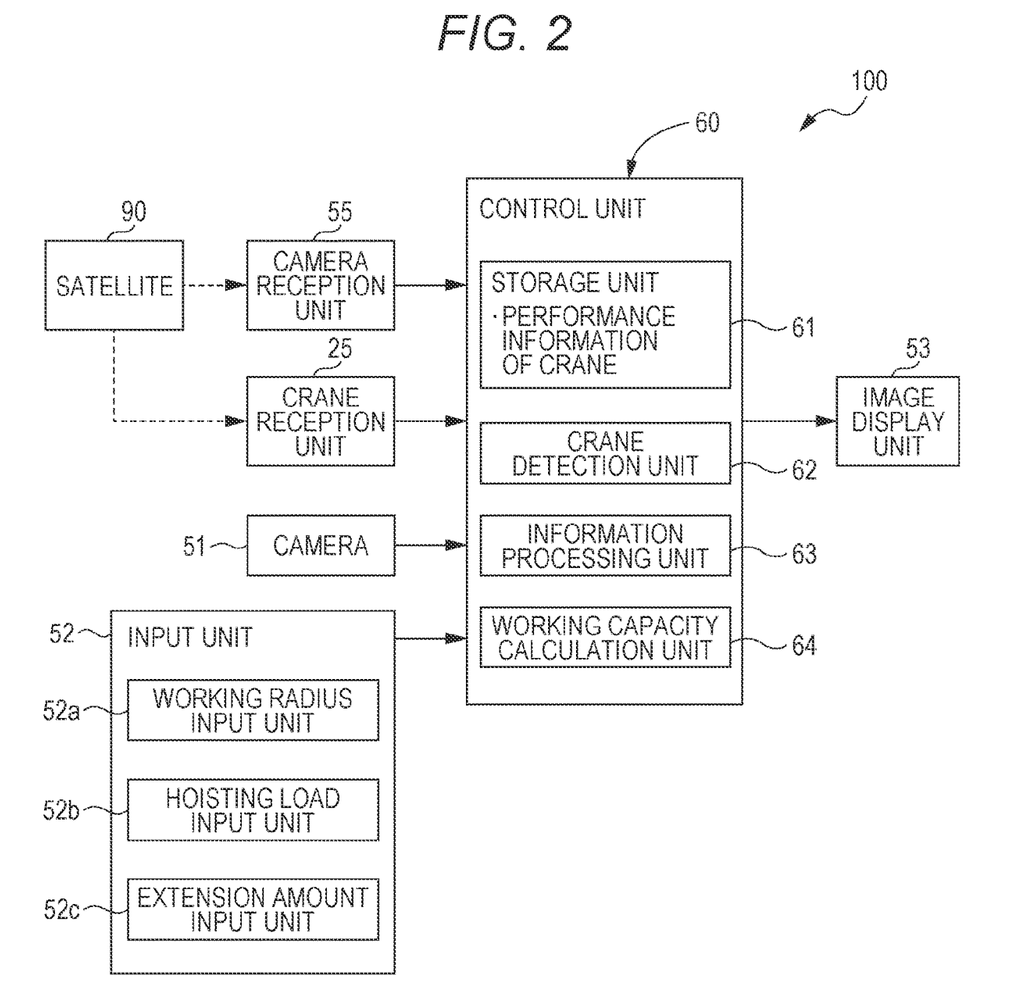
FIG. 2 is a block diagram illustrating a functional configuration of the crane information display system of Example 1.
Figure 3:
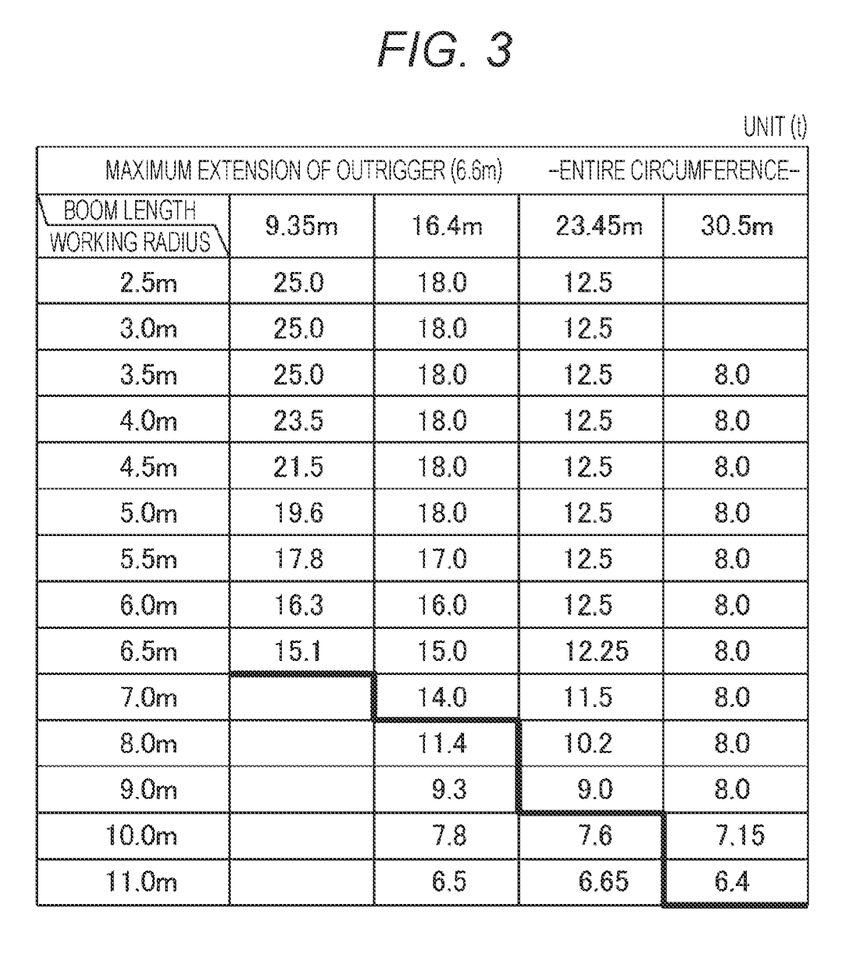
FIG. 3 is a table showing performance information of a crane stored in a storage unit of Example 1.
Figure 4:
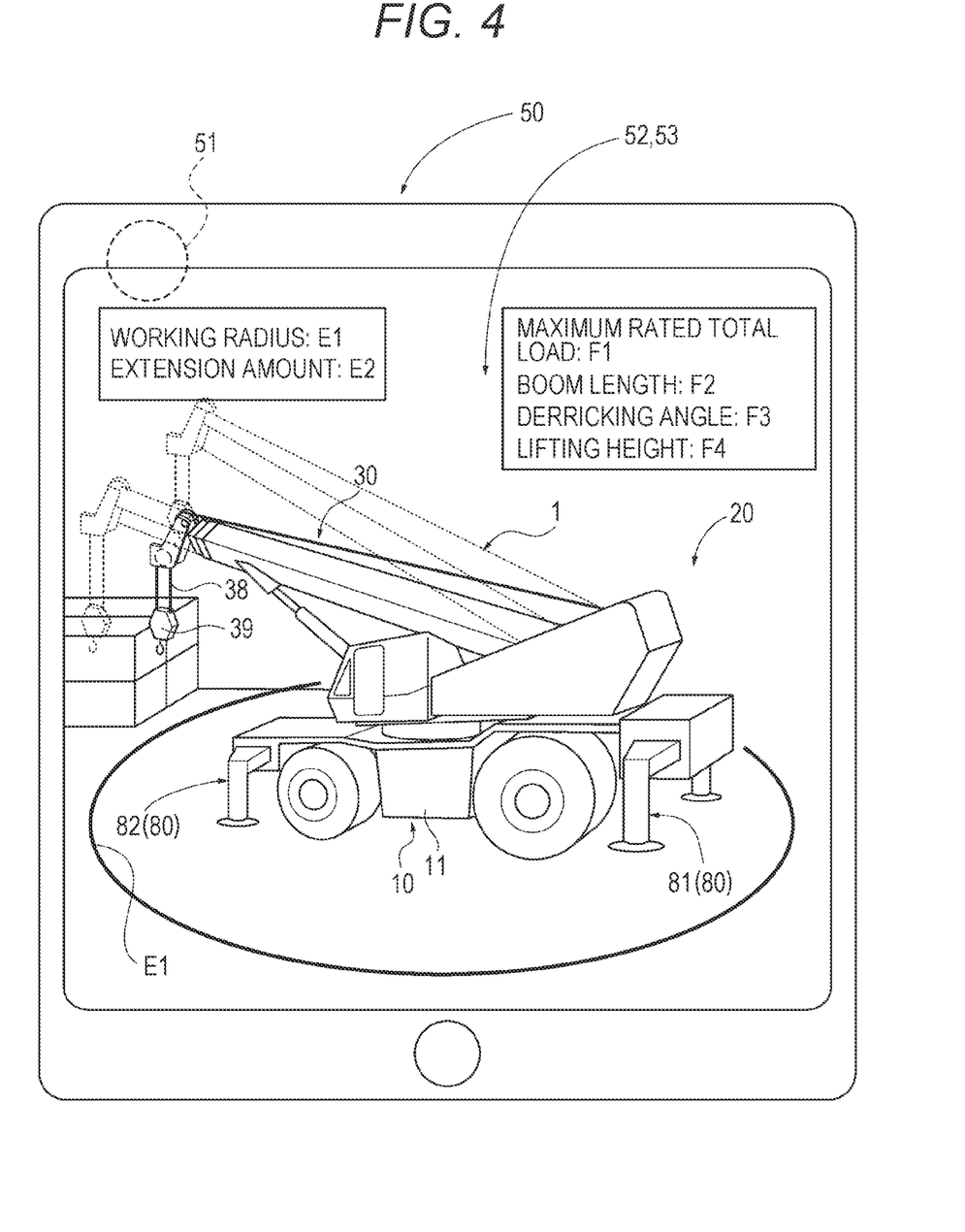
FIG. 4 is a view illustrating an image displayed on an image display unit of Example 1.

FIG. 2 is a block diagram illustrating a functional configuration of the crane information display system 100 of Example 1. FIG. 3 is a table showing performance information of the crane stored in a storage unit 61 of Example 1. FIG. 4 is a view illustrating an image displayed on the image display unit 53 of Example 1. Hereinafter, a functional configuration of the crane information display system 100 of Example 1 will be described.

In the crane information display system 100, the position information of the camera 51 received from the satellite 90 by the camera reception unit 55, the position information of the turning center of the crane 1 received from the satellite 90 by the crane reception unit 25, and input information inputted by the input unit 52 are inputted to a control unit 60 (control unit built in the tablet terminal 50 in the present embodiment), and information controlled by the control unit 60 is outputted by the image display unit 53.

The camera 51 can be configured as, for example, the camera 51 provided in the general tablet terminal 50. The camera 51 can capture an image of the crane 1 and a surrounding site environment of the crane 1.

Information relating to the crane 1 can be inputted to the input unit 52. The input unit 52 includes a working radius input unit 52a, a hoisting load input unit 52b, and an extension amount input unit 52c.

A working radius of the crane 1 can be inputted to the working radius input unit 52a. The working radius is a horizontal distance from a vertical line drawn from the center of the hook 39 to the vertical axis C1 which is the turning center of the turning body 20. The working radius is inputted by tapping a touch panel serving as the input unit 52.

A hoisting load to be worked can be inputted to the hoisting load input unit 52b. The hoisting load is the weight (mass) of the suspended load and is the load applied to the crane 1.

An extension amount of the outrigger 80 can be inputted to the extension amount input unit 52c. The extension amount of the outrigger 80 is an extension amount in the width direction of the crane 1.

Further, a length of the boom 30 and the like can be inputted to the input unit 52. The length of the boom 30 is a length of the boom 30 in a state in which the distal end boom 36 and the intermediate booms 32 to 35 are stored in the base end boom 31 (fully contracted state), a length of the boom 30 in a state in which the distal end boom 36 is extended, a length in a state in which the distal end boom 36 and the intermediate booms 32 to 35 are extended (fully extended state), or the like.

The control unit 60 includes the storage unit 61, a crane detection unit 62, an information processing unit 63, and a working capacity calculation unit 64. Note that the control unit 60 is a known microcomputer including, for example, a central processing unit (CPU), a random access memory (RAM), a read only memory (ROM), and the like. The functions (the crane detection unit 62, the information processing unit 63, and the working capacity calculation unit 64) of the control unit 60 are achieved, for example, by the CPU referring to a control program and various types of data stored in the storage unit 61 (e.g., an HDD), the ROM, or the RAM.

The storage unit 61 stores performance information of the crane 1. The performance information includes a rated total load table G associated with the extension amount of the outrigger 80. FIG. 3 illustrates, as an example, a rated total load according to the length of the boom 30 and the working radius in a case where the extension amount of the outrigger 80 is 6.6 [m]. The rated total load is a limit value of the load that can be lifted with a predetermined length of the boom 30 and a predetermined working radius. In other words, the rated total load, the length of the boom 30, and the working radius are mutually related, and a limit value of the length of the boom 30, a limit value of a derricking angle of the boom 30, a limit value of a lifting height of the crane 1, and the like are specified when the rated total load and the working radius are determined, for example.

For example, in a case where the extension amount of the outrigger 80 is 6.6 [m], the working radius is 5.0 [m] and the length of the boom 30 is 9.35 [m], the rated total load becomes 19.6 [t]. In a case where the extension amount of the outrigger 80 is 6.6 [m], the working radius is 10.0 [m], and the length of the boom 30 is 30.5 [m], the rated total load becomes 7.15 [t].

The crane detection unit 62 detects the crane 1 in the image captured by the camera 51 by image authentication on the basis of the image captured by the camera 51 of the crane 1 placed at the work site. Further, the crane detection unit 62 detects the turning center of the crane 1 in the image captured by the camera 51. As a result, an orientation of the crane 1 in the image from the camera 51 (that is, an orientation of the camera 51 with respect to the crane 1) is detected.

The information processing unit 63 performs processing of associating the turning center of the crane 1 detected by the crane detection unit 62 with the position information of the camera 51 received by the camera reception unit 55 and the position information of the turning center of the crane 1 received by the crane reception unit 25.

Specifically, the information processing unit 63 acquires the orientation of the crane 1 in the image from the camera 51 (that is, the orientation of the camera 51 with respect to the crane 1) on the basis of the turning center of the crane 1 detected by the crane detection unit 62. Further, the information processing unit 63 associates the position of the camera 51 and the position of the turning center of the crane 1 with the image captured by the camera 51 on the basis of the orientation of the camera 51, the position information of the camera 51 received by the camera reception unit 55, and the position information of the turning center of the crane 1 received by the crane reception unit 25. That is, the information processing unit 63 identifies the position and posture of the crane 1 in the coordinate system of the image from the camera 51 on the basis of the orientation of the camera 51 with respect to the crane 1, the position information of the camera 51 in the real space received by the camera reception unit 55, and the position information of the turning center of the crane 1 in the real space received by the crane reception unit 25.

The working capacity calculation unit 64 calculates the working capacity of the crane 1 on the basis of the information relating to the crane 1 inputted to the input unit 52. In Example 1, the working capacity calculation unit 64 refers to the rated total load table G stored in the storage unit 61 on the basis of the working radius inputted to the working radius input unit 52a and the extension amount of the outrigger 80 inputted to the extension amount input unit 52c and calculates a maximum rated total load of the crane 1, a length of the boom 30 (that is, a limit value of the length of the boom 30), a derricking angle of the boom 30 (that is, a limit value of the derricking angle of the boom 30), and a lifting height of the crane 1 (that is, a limit value of the lifting height of the crane 1).

Here, the length of the boom 30, the derricking angle of the boom 30, and the lifting height of the crane 1 calculated by the working capacity calculation unit 64 are a limit value within a range that the length of the boom 30 can take, a limit value within a range that the derricking angle of the boom 30 can take, and a limit value within a range that the lifting height of the crane 1 can take under conditions of the working radius inputted to the working radius input unit 52a, the extension amount of the outrigger 80 inputted to the extension amount input unit 52c, and the maximum rated total load of the crane 1 identified from the rated total load table G.

For example, in a case where the working radius inputted to the working radius input unit 52a is 5 [m] and the extension amount of the outrigger 80 inputted to the extension amount input unit 52c is 6.6 [m] as illustrated in FIG. 3, the working capacity calculation unit 64 refers to the rated total load table G and calculates the maximum rated total load of the crane 1 as 19.6 [t]. Further, the working capacity calculation unit 64 calculates the length of the boom 30 at that time as 9.35 [m]. Further, the working capacity calculation unit 64 calculates the derricking angle of the boom 30 and the lifting height of the crane 1 on the basis of the working radius inputted to the working radius input unit 52a and the calculated length of the boom 30.

Here, the working capacity calculation unit 64 selects 19.6 [t] as the maximum rated total load under conditions that the working radius is 5 [m] and the extension amount of the outrigger 80 is 6.6 [m] from among rated total loads of the crane 1 defined in the rated total load table G of FIG. 3, and calculates the length and the like of the boom 30 so as to correspond to the rated total load. However, when the length of the boom 30 can be inputted to the input unit 52, the working capacity calculation unit 64 may determine the rated total load of the crane 1 on the basis of the working radius inputted to the input unit 52, the extension amount of the outrigger 80, and the length of the boom 30.

As illustrated in FIG. 4, the image display unit 53 superimposes, on the image of the crane 1 and the surrounding site environment thereof captured by the camera 51, a working radius E1 inputted to the working radius input unit 52a, an extension amount E2 of the outrigger 80 inputted to the extension amount input unit 52c, a maximum rated total load F1 of the crane 1, a length F2 of the boom 30 (that is, the limit value of the length of the boom 30), a derricking angle F3 of the boom 30 (that is, the limit value of the derricking angle of the boom 30), and a lifting height F4 of the crane 1 (that is, the limit value of the lifting height of the crane 1), on the basis of the information processed by the information processing unit 63, and displays the superimposed image.

At this time, the image display unit 53 displays at least a part of the information of the maximum rated total load F1 of the crane 1, the length F2 of the boom 30, the derricking angle F3 of the boom 30, and the lifting height F4 of the crane 1 as a three-dimensional image to be overlaid on the crane 1 or the surrounding environment of the crane 1 in the image from the camera 51 such that a user can three-dimensionally examine how the site environment is affected by each part of the crane 1 at the time of actually operating the crane 1 at the site. In FIG. 4, pieces of the information on the length F2 of the boom 30 and the derricking angle F3 of the boom 30 are displayed as a three-dimensional image by a dotted line so as to be overlaid on the crane 1 in the image from the camera 51.

[Flow of Processing Performed by Control Unit]

Figure 5:
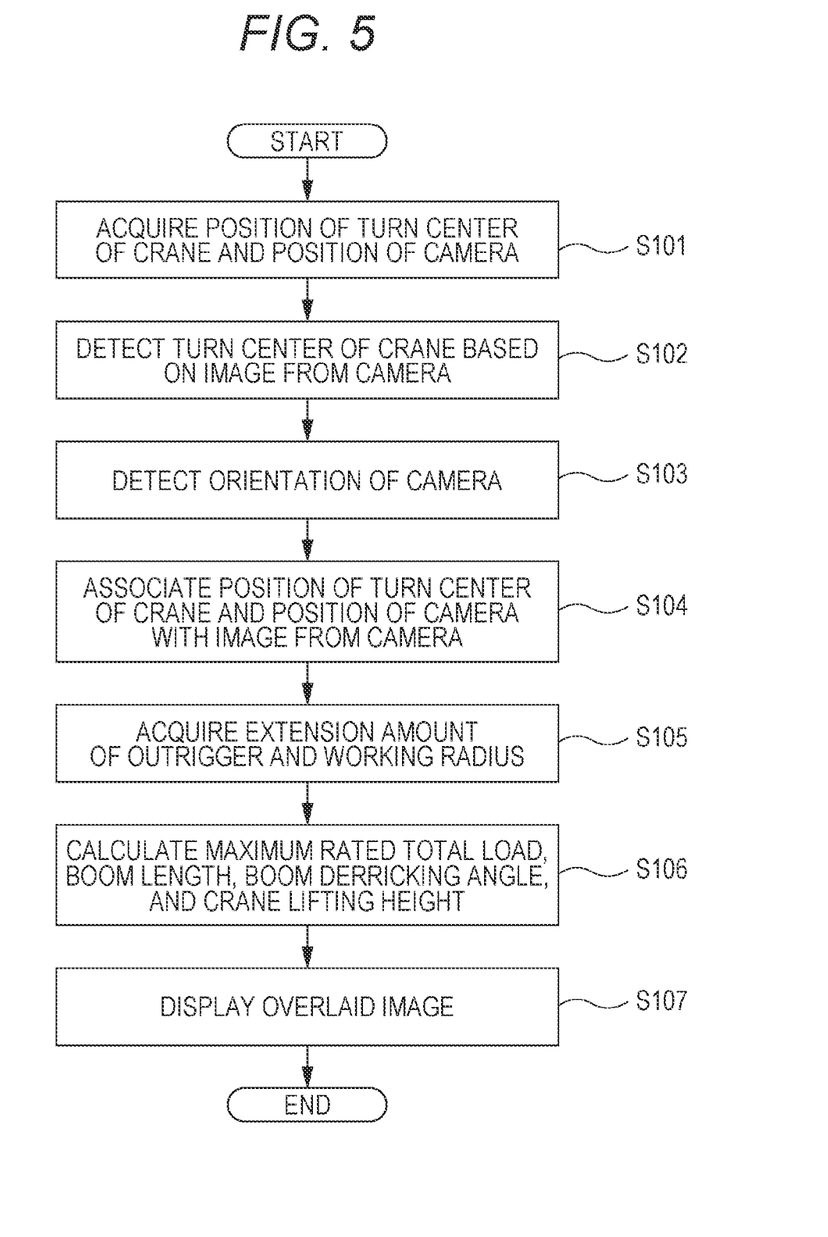
FIG. 5 is a flowchart illustrating a flow of processing performed by a control unit of the crane information display system of Example 1.

FIG. 5 is a flowchart illustrating a flow of processing performed by the control unit 60 of the crane information display system 100 of Example 1. Hereinafter, the flow of processing performed by the control unit 60 of the crane information display system 100 of Example 1 will be described.

When the worker M captures an image of the crane 1 installed at a work site and a surrounding work environment thereof with the camera 51 of the tablet terminal 50, the control unit 60 acquires information on a position of a turning center of the crane 1 inputted from the crane reception unit 25 and information on a position of the camera 51 inputted from the camera reception unit 55, as illustrated in FIG. 5 (step S101).

Next, the crane detection unit 62 detects the turning center of the crane 1 on the basis of the image obtained by capturing the crane 1 placed at the work site with the camera 51 (step S102).

Next, the information processing unit 63 acquires the orientation of the camera 51 on the basis of the turning center of the crane 1 detected by the crane detection unit 62 (step S103).

Next, the information processing unit 63 performs processing of associating the position of the camera 51 and the position of the turning center of the crane 1 with the image captured by the camera 51 on the basis of the orientation of the camera 51, the position information of the camera 51 received by the camera reception unit 55, and the position information of the turning center of the crane 1 received by the crane reception unit 25 (step S104).

Next, the control unit 60 acquires the working radius E1 inputted to the working radius input unit 52a and the extension amount E2 of the outrigger 80 inputted to the extension amount input unit 52c (step S105).

Next, the working capacity calculation unit 64 calculates the maximum rated total load F1 of the crane 1, the length F2 of the boom 30, the derricking angle F3 of the boom 30, and the lifting height F4 of the crane 1 on the basis of the working radius E1 inputted to the working radius input unit 52a and the extension amount E2 of the outrigger 80 inputted to the extension amount input unit 52c (step S106).

Next, the image display unit 53 superimposes, on the image of the crane 1 and the surrounding site environment thereof captured by the camera 51, the working radius E1 inputted to the working radius input unit 52a, the extension amount E2 of the outrigger 80 inputted to the extension amount input unit 52c, the maximum rated total load F1 of the crane 1, the length F2 of the boom 30, the derricking angle F3 of the boom 30, and the lifting height F4 of the crane 1, displays the superimposed image (step S107), and ends the processing.

Note that, in a case where the orientation of the camera 51 is changed, a vector from the time of initialization may be acquired by a SLAM technique or an acceleration sensor to follow the vector.

[Functions and Effects of Crane Information Display System]

Hereinafter, functions and effects of the crane information display system 100 of Example 1 will be described.

The crane information display system 100 of Example 1 includes: the crane detection unit 62 that detects the crane 1 placed at a work site on the basis of an image of the crane 1 captured by the camera 51; the camera reception unit 55 that is mounted on the camera 51 and receives position information of the camera 51 from the satellite 90; the crane reception unit 25 that is mounted on the crane 1 and receives position information of the crane 1 from the satellite 90; the information processing unit 63 that performs processing of associating the crane 1 detected by the crane detection unit 62 with the position information of the camera 51 received by the camera reception unit 55 and the position information of the crane 1 received by the crane reception unit 25; the input unit 52 that inputs information relating to the crane 1; the working capacity calculation unit 64 that calculates the working capacity of the crane 1 based on the information relating to the crane 1 inputted to the input unit 52; and the image display unit 53 that displays the working capacity of the crane 1 calculated by the working capacity calculation unit 64 on the image captured by the camera 51 based on the information processed by the information processing unit 63 (FIGS. 2 and 4).

As a result, the working capacity of the crane 1 can be overlaid on the image of the actual crane 1 arranged at the work site. Therefore, the crane 1, the surrounding environment thereof, and the working capacity of the crane 1 can be confirmed by the three-dimensional image in real time. As a result, a work plan of the crane 1 can be examined in real time at the work site.

In the crane information display system 100 of Example 1, the input unit 52 includes the working radius input unit 52a to which the working radius E1 of the crane 1 is inputted, and the working capacity calculation unit 64 calculates the maximum rated total load F1 of the crane 1 on the basis of an input value of the working radius input unit 52a (FIGS. 2 and 4).

As a result, it is possible to know a maximum rated total load at a desired point. Therefore, it is possible to know a maximum rated total load during the movement of the suspended load from a start position to an end position by the crane 1.

In the crane information display system 100 of Example 1, the working capacity calculation unit 64 calculates the length F2 of the boom 30 and the derricking angle F3 of the boom 30 on the basis of an input value of the input unit 52 (FIGS. 2 and 4).

As a result, the posture of the crane 1 during the work can be known.

In the crane information display system 100 of Example 1, the input unit 52 includes the extension amount input unit 52c that inputs the extension amount E2 of the outrigger, and the working capacity calculation unit 64 calculates the working capacity of the crane 1 on the basis of an input value of the extension amount input unit 52c (FIGS. 2 and 4).

Therefore, the working capacity of the crane 1 based on the extension amount E2 of the outrigger 80 can be examined.

Example 2

A crane information display system of Example 2 is different from the crane information display system of Example 1 in that a working capacity calculation unit has a different configuration.

[Functional Configuration of Crane Information Display System]

Figure 6:
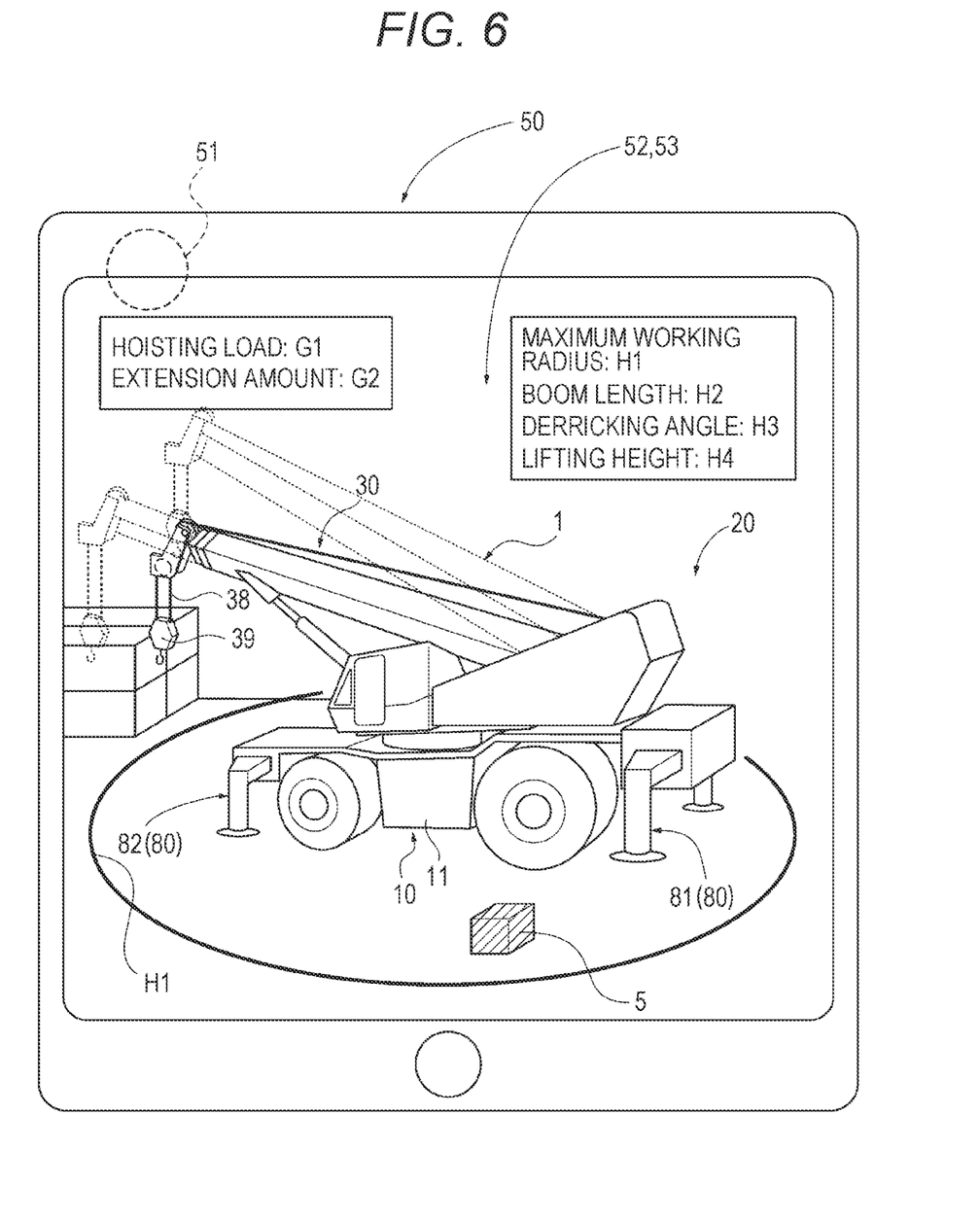
FIG. 6 is a view illustrating an image displayed on an image display unit of Example 2.

FIG. 6 is a view illustrating an image displayed on an image display unit of Example 2. Hereinafter, a configuration of the crane information display system of Example 2 will be described. Note that the same or equivalent portions as the content described in Example 1 will be described using the same terms or the same reference signs.

The working capacity calculation unit 64 calculates the working capacity of the crane 1 on the basis of the information relating to the crane 1 inputted to the input unit 52. In Example 2, the working capacity calculation unit 64 refers to the rated total load table G stored in the storage unit 61 on the basis of a hoisting load inputted to the hoisting load input unit 52b and an extension amount of the outrigger 80 inputted to the extension amount input unit 52c and calculates a maximum working radius of the crane 1, a length of the boom 30 (that is, a limit value of the length of the boom 30), a derricking angle of the boom 30 (that is, a limit value of the derricking angle of the boom 30), and a lifting height of the crane 1 (that is, a limit value of the lifting height of the boom 30).

For example, in a case where the hoisting load inputted to the hoisting load input unit 52b is 15.0 [t] and the extension amount of the outrigger 80 inputted to the extension amount input unit 52c is 6.6 [m] as illustrated in FIG. 3, the working capacity calculation unit 64 refers to the rated total load table G and calculates the maximum working radius of the crane 1 as 6.5 [m]. Further, the working capacity calculation unit 64 calculates the length of the boom 30 at that time as 16.4 [m]. Further, the working capacity calculation unit 64 calculates the derricking angle of the boom 30 and the lifting height of the crane 1 on the basis of the calculated maximum working radius and the calculated length of the boom 30.

As illustrated in FIG. 6, the image display unit 53 superimposes, on an image of the crane 1 and a surrounding site environment thereof captured by the camera 51, a hoisting load G1 of a suspended load 5 to be worked, which has been inputted to the hoisting load input unit 52b, an extension amount G2 of the outrigger 80 inputted to the extension amount input unit 52c, a maximum working radius H1 of the crane 1, a length H2 of the boom 30, a derricking angle H3 of the boom 30, and a lifting height H4 of the crane 1, on the basis of the information processed by the information processing unit 63, and displays the superimposed image.

[Flow of Processing Performed by Control Unit]

Figure 7:
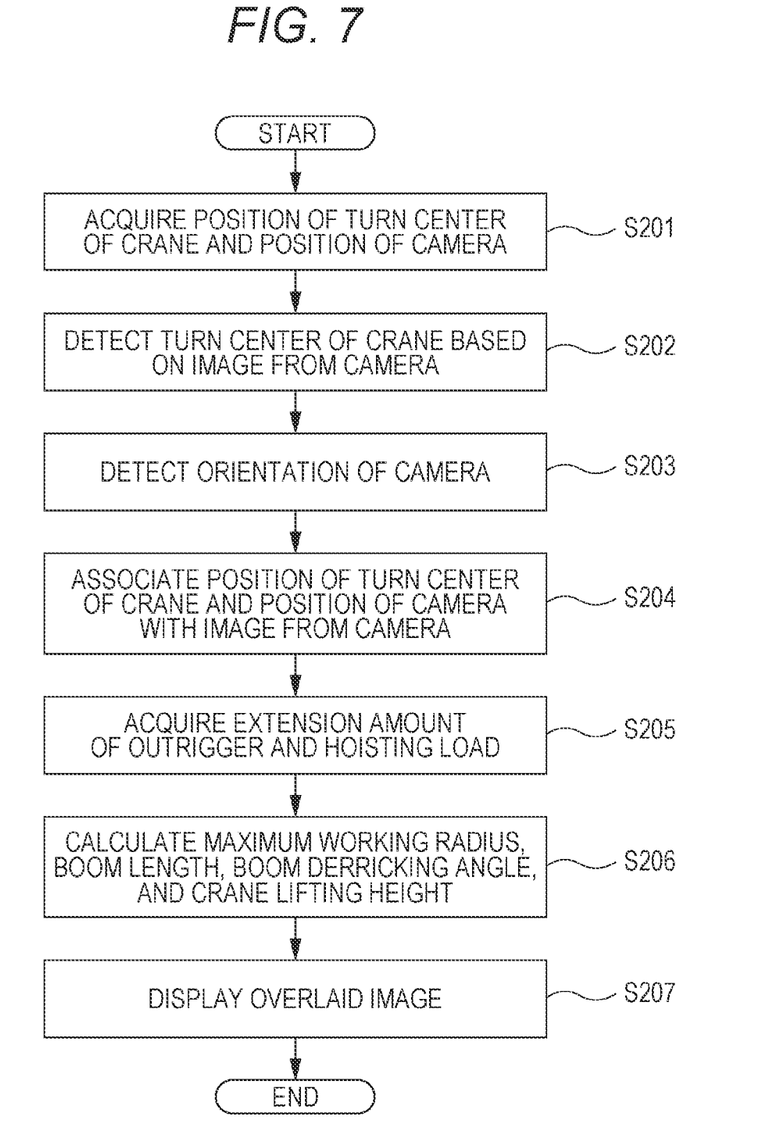
FIG. 7 is a flowchart illustrating a flow of processing performed by a control unit of a crane information display system of Example 2.

FIG. 7 is a flowchart illustrating a flow of processing performed by the control unit 60 of the crane information display system 100 of Example 2. Hereinafter, the flow of processing performed by the control unit 60 of the crane information display system 100 of Example 2 will be described.

When the worker M captures an image of the crane 1 installed at a work site and a surrounding work environment thereof with the camera 51 of the tablet terminal 50, the control unit 60 acquires information on a position of a turning center of the crane 1 inputted from the crane reception unit 25 and information on a position of the camera 51 inputted from the camera reception unit 55, as illustrated in FIG. 7 (step S201).

Next, the crane detection unit 62 detects the turning center of the crane 1 on the basis of the image obtained by capturing the crane 1 placed at the work site with the camera 51 (step S202).

Next, the information processing unit 63 acquires the orientation of the camera 51 on the basis of the turning center of the crane 1 detected by the crane detection unit 62 (step S203).

Next, the information processing unit 63 performs processing of associating the position of the camera 51 and the position of the turning center of the crane 1 with the image captured by the camera 51 on the basis of the orientation of the camera 51, the position information of the camera 51 received by the camera reception unit 55, and the position information of the turning center of the crane 1 received by the crane reception unit 25 (step S204).

Next, the control unit 60 acquires the hoisting load G1 inputted to the hoisting load input unit 52b and the extension amount G2 of the outrigger 80 inputted to the extension amount input unit 52c (step S105).

Next, the working capacity calculation unit 64 calculates the maximum working radius H1 of the crane 1, the length H2 of the boom 30, the derricking angle H3 of the boom 30, and the lifting height H4 of the crane 1 on the basis of the hoisting load G1 inputted to the hoisting load input unit 52b and the extension amount G2 of the outrigger 80 inputted to the extension amount input unit 52c (step S206).

Next, the image display unit 53 superimposes, on the image of the crane 1 and the surrounding site environment thereof captured by the camera 51, the hoisting load G1 inputted to the hoisting load input unit 52b, the extension amount G2 of the outrigger 80 inputted to the extension amount input unit 52c, the maximum working radius H1 of the crane 1, the length H2 of the boom 30, the derricking angle H3 of the boom 30, and the lifting height H4 of the crane 1, displays the superimposed image (step S207), and ends the processing.

Note that, in a case where the orientation of the camera 51 is changed, a vector from the time of initialization may be acquired by a SLAM technique or an acceleration sensor to follow the vector.

[Functions and Effects of Crane Information Display System]

Hereinafter, functions and effects of the crane information display system 100 of Example 2 will be described.

In the crane information display system 100 of Example 2, the input unit 52 includes the hoisting load input unit 52b that inputs the hoisting load G1, and the working capacity calculation unit 64 calculates the maximum working radius H1 of the crane 1 on the basis of an input value of the hoisting load input unit 52b (FIGS. 2 and 6).

As a result, the maximum working radius H1 can be calculated for a suspended load to be worked. Therefore, it is possible to easily examine a start position and an end position between which the crane 1 is moved with respect to the suspended load to be worked. Further, it is also possible to examine an installation position where the crane 1 is installed next. Further, when the maximum working radii H1 of a plurality of cranes are confirmed by the image display unit 53, the interference between the cranes can be avoided.

Other configurations as well as functions and effects are substantially the same as those of the above example and, thus, the description thereof will not be repeated.

Example 3

A crane information display system of Example 3 is different from the crane information display system of Example 1 in that a working capacity calculation unit has a different configuration.

[Functional Configuration of Crane Information Display System]

Figure 8:
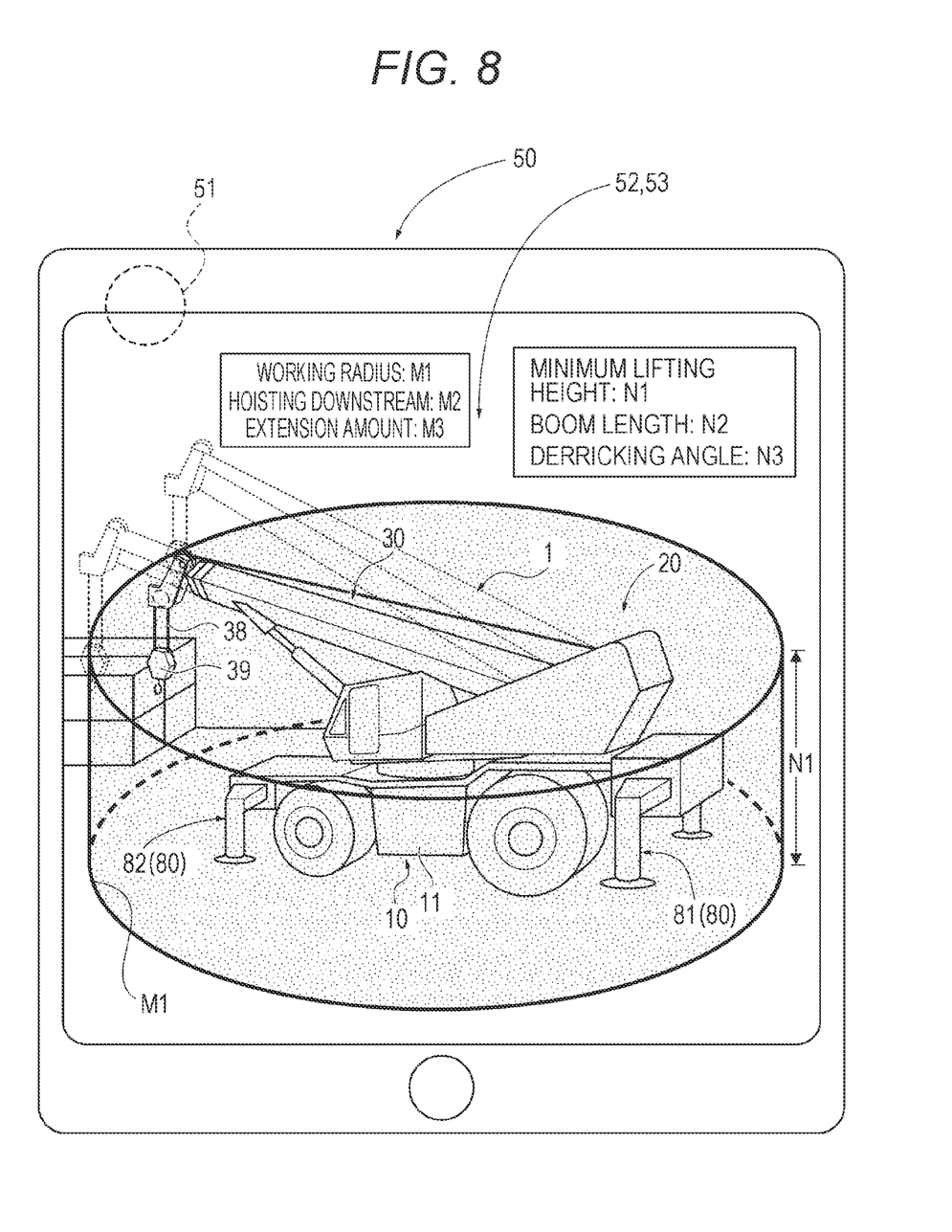
FIG. 8 is a view illustrating an image displayed on an image display unit of Example 3.

FIG. 8 is a view illustrating an image displayed on an image display unit of Example 3. Hereinafter, a configuration of the crane information display system of Example 3 will be described. Note that the same or equivalent portions as the content described in Example 1 will be described using the same terms or the same reference signs.

The working capacity calculation unit 64 calculates the working capacity of the crane 1 on the basis of the information relating to the crane 1 inputted to the input unit 52. In Example 3, the working capacity calculation unit 64 refers to the rated total load table G stored in the storage unit 61 on the basis of a working radius inputted to the working radius input unit 52a, a hoisting load inputted to the hoisting load input unit 52b, and an extension amount of the outrigger 80 inputted to the extension amount input unit 52c and calculates a lowest lifting height of the crane 1, a length of the boom 30 (that is, a limit value of the length of the boom 30), and a derricking angle of the boom 30 (that is, a limit value of the derricking angle of the boom 30).

For example, in a case where the working radius inputted to the working radius input unit 52a is 5.0 [m], the hoisting load inputted to the hoisting load input unit 52b is 18.0 [t], and the extension amount of the outrigger 80 inputted to the extension amount input unit 52c is 6.6 [m] as illustrated in FIG. 3, the working capacity calculation unit 64 refers to the rated total load table G and calculates the lowest lifting height of the crane 1 and the length of the boom 30. Further, the working capacity calculation unit 64 calculates the derricking angle of the boom 30 on the basis of the input working radius and the calculated length of the boom 30.

As illustrated in FIG. 8, the image display unit 53 superimposes, on an image of the crane 1 and a surrounding site environment thereof captured by the camera 51, a working radius M1 inputted to the working radius input unit 52a, a hoisting load M2 inputted to the hoisting load input unit 52b, an extension amount M3 of the outrigger 80 inputted to the extension amount input unit 52c, a lowest lifting height N1 of the crane 1, a length N2 of the boom 30, and a derricking angle N3 of the boom 30, on the basis of the information processed by the information processing unit 63, and displays the superimposed image.

[Flow of Processing Performed by Control Unit]

Figure 9:
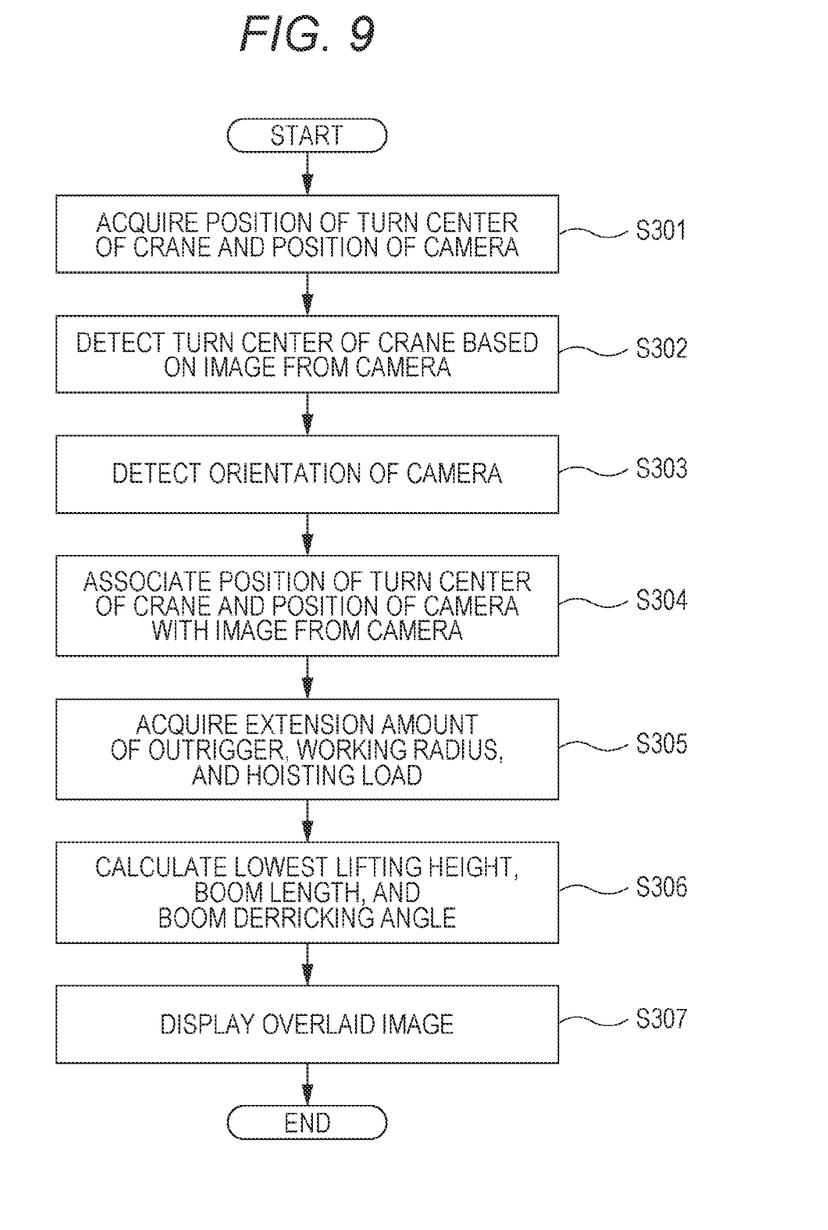
FIG. 9 is a flowchart illustrating a flow of processing performed by a control unit of a crane information display system of Example 3.

FIG. 9 is a flowchart illustrating a flow of processing performed by the control unit 60 of the crane information display system 100 of Example 3. Hereinafter, the flow of processing performed by the control unit 60 of the crane information display system 100 of Example 3 will be described.

When the worker M captures an image of the crane 1 installed at a work site and a surrounding work environment thereof with the camera 51 of the tablet terminal 50, the control unit 60 acquires information on a position of a turning center of the crane 1 inputted from the crane reception unit 25 and information on a position of the camera 51 inputted from the camera reception unit 55, as illustrated in FIG. 9 (step S301).

Next, the crane detection unit 62 detects the turning center of the crane 1 on the basis of the image obtained by capturing the crane 1 placed at the work site with the camera 51 (step S302).

Next, the information processing unit 63 acquires the orientation of the camera 51 on the basis of the turning center of the crane 1 detected by the crane detection unit 62 (step S303).

Next, the information processing unit 63 performs processing of associating the position of the camera 51 and the position of the turning center of the crane 1 with the image captured by the camera 51 on the basis of the orientation of the camera 51, the position information of the camera 51 received by the camera reception unit 55, and the position information of the turning center of the crane 1 received by the crane reception unit 25 (step S304).

Next, the control unit 60 acquires the working radius M1 inputted to the working radius input unit 52a, the hoisting load M2 inputted to the hoisting load input unit 52b, and the extension amount M3 of the outrigger 80 inputted to the extension amount input unit 52c (step S305).

Next, the working capacity calculation unit 64 calculates the extension amount M3 of the outrigger 80 inputted to the extension amount input unit 52c, the lowest lifting height N1 of the crane 1, the length N2 of the boom 30, and the derricking angle N3 of the boom 30 on the basis of the working radius M1 inputted to the working radius input unit 52a, the hoisting load M2 inputted to the hoisting load input unit 52b, and the extension amount M3 of the outrigger 80 inputted to the extension amount input unit 52c (step S306).

Next, the image display unit 53 superimposes, on the image of the crane 1 and the surrounding site environment thereof captured by the camera 51, the working radius M1 inputted to the working radius input unit 52a, the hoisting load M2 inputted to the hoisting load input unit 52b, the extension amount M3 of the outrigger 80 inputted to the extension amount input unit 52c, the lowest lifting height N1 of the crane 1, the length N2 of the boom 30, and the derricking angle N3 of the boom 30, displays the superimposed image (step S307), and ends the processing.

Note that, in a case where the orientation of the camera 51 is changed, a vector from the time of initialization may be acquired by a SLAM technique or an acceleration sensor to follow the vector.

[Functions and Effects of Crane Information Display System]

Hereinafter, functions and effects of the crane information display system 100 of Example 3 will be described.

In the crane information display system 100 of Example 3, the input unit 52 includes the working radius input unit 52a to which the working radius M1 of the crane 1 is inputted and the hoisting load input unit 52b to which the hoisting load M2 is inputted, and the working capacity calculation unit 64 calculates the lowest lifting height N1 of the crane 1 on the basis of an input value of the working radius input unit 52a and an input value of the hoisting load input unit 52b.

As a result, the lowest lifting height N1 can be calculated for a hoisting load to be worked at a desired position. Therefore, it is possible to examine the lowest lifting height to move a suspended load to be worked from a start position to an end position by the crane 1. As a result, it is possible to perform an examination for reducing a work area of the crane 1.

Other configurations as well as functions and effects are substantially the same as those of the above example and, thus, the description thereof will not be repeated.

The crane information display system of the present invention has been described above with reference to Examples 1 to 3. However, a specific configuration is not limited to these examples, and combinations of the examples, design changes, additions, and the like are allowed as far as they do not depart from the gist of the invention according to each one of the claims.

Examples 1 to 3 have illustrated the example in which the touch panel serving as the input unit 52 is tapped to input the working radius to the working radius input unit 52a. However, a reception unit that receives a global navigation satellite system (GNSS) signal from a GNSS satellite serving as the satellite 90 may be installed at a target point of the work site, and the signal from the reception unit may be inputted to the input unit.

Examples 1 to 3 have illustrated the example in which the working radius does not take into consideration a bending amount of the boom 30. However, the working radius can also take into account the amount of bending of the boom.

Examples 1 to 3 have illustrated the example in which the user terminal is the tablet terminal 50 including the camera 51, the input unit 52, and the image display unit 53. However, the user terminal may be a smart phone. Further, the user terminal may include a camera and an image display unit which are separate bodies.

Examples 1 to 3 have illustrated the example in which the present invention is applied to the crane 1 including the boom 30. However, the present invention can be applied to a crane including a jib.

REFERENCE SIGNS LIST

1 crane
25 crane reception unit
50 tablet terminal
51 camera
52 input unit
52*a* working radius input unit
52*c* extension amount input unit
52*b* hoisting load input unit
53 image display unit
55 camera reception unit
62 crane detection unit
63 information processing unit
64 working capacity calculation unit
90 satellite
100 crane information display system

The invention claimed is:

1. A crane information display system that is provided with a terminal device having a camera and captures an image of a crane with the camera to obtain a camera image, the crane information display system comprising:
  a crane detection unit that detects the crane in the camera image based on image information of the camera image;
  an information processing unit that identifies a position and a posture of the crane in a coordinate system of the camera image based on an orientation of the camera with respect to the crane identified from the crane in the camera image, a position of the camera in a real space indicated by a first satellite positioning signal reception unit mounted on the camera, and a position of the crane in a real space indicated by a second satellite positioning signal reception unit mounted on the crane;
  a working capacity calculation unit that calculates a working capacity of the crane based on information relating to the crane inputted to an input unit; and
  an image display unit that converts the working capacity of the crane into three-dimensional image information corresponding to the position and the posture of the crane identified by the information processing unit, overlays the image information on the camera image, and displays the overlaid image.

2. The crane information display system according to claim 1, wherein
  the input unit includes a working radius input unit that inputs a working radius of the crane, and
  the working capacity calculation unit calculates a maximum rated total load of the crane, as the working capacity of the crane to be displayed, based on an input value of the working radius input unit.

3. The crane information display system according to claim 1, wherein
  the input unit includes a hoisting load input unit that inputs a hoisting load, and
  the working capacity calculation unit calculates a maximum working radius of the crane, as the working capacity of the crane to be displayed, based on an input value of the hoisting load input unit.

4. The crane information display system according to claim 1, wherein
  the input unit includes a working radius input unit that inputs a working radius of the crane, and a hoisting load input unit that inputs a hoisting load, and
  the working capacity calculation unit calculates a lowest lifting height of the crane, as the working capacity of the crane to be displayed, based on an input value of the working radius input unit and an input value of the hoisting load input unit.

5. The crane information display system according to claim 1, wherein
  the working capacity calculation unit calculates a limit value of a length of the boom and a limit value of a derricking angle of the boom, as the working capacity of the crane to be displayed.

6. The crane information display system according to claim 1, wherein
  the input unit includes an extension amount input unit that inputs an extension amount of the outrigger, and
  the working capacity calculation unit calculates the working capacity of the crane based on an input value to the extension amount input unit.

* * * * *